No. 661,296. Patented Nov. 6, 1900.
C. E. STRUBLE.
RECORD BLANK OR FORM.
(Application filed Apr. 28, 1900.)

(No Model.) 2 Sheets—Sheet 1.

Witnesses:
Andrew J. Smith
L. M. Jones

Inventor:
Charles Edwin Struble,
by John Elias Jones,
his Attorney.

THE NORRIS PETERS CO., PHOTO-LITHO., WASHINGTON, D. C.

No. 661,296. Patented Nov. 6, 1900.
C. E. STRUBLE.
RECORD BLANK OR FORM.
(Application filed Apr. 28, 1900.)

(No Model.) 2 Sheets—Sheet 2.

Witnesses
J. D. Thorne
W. P. Biddle

Inventor
Charles Edwin Struble,
by John Elias Jones,
Attorney.

UNITED STATES PATENT OFFICE.

CHARLES E. STRUBLE, OF HARTWELL, OHIO.

RECORD BLANK OR FORM.

SPECIFICATION forming part of Letters Patent No. 661,296, dated November 6, 1900.

Application filed April 28, 1900. Serial No. 14,723. (No model.)

*To all whom it may concern:*

Be it known that I, CHARLES EDWIN STRUBLE, a citizen of the United States of America, and a resident of Hartwell, in the county of Hamilton and State of Ohio, have invented certain new and useful Improvements in Record Blanks or Forms, of which the following is a specification.

This invention relates to certain improvements in record blanks or forms such as are adapted for use in the general offices of railway companies and the like for preparing tabulated records; and the object of the invention is to provide blanks or forms of this character of a simple and improved construction adapted to be bound together in book form and of such a nature as to permit of a very material reduction in both the size and thickness of the bound volume, whereby an important economy is effected in the cost of preparing and also in the storage and care of the records and the same are rendered much more easy and convenient for reference.

The invention consists in certain novel features of the construction, combination, and arrangement of the several parts of the improved blank, whereby certain important advantages are attained and the device is made simpler, cheaper, more compact, and otherwise better adapted and more convenient for use, all as will be hereinafter fully set forth.

The novel features of the invention will be carefully defined in the claims.

Figure 1:
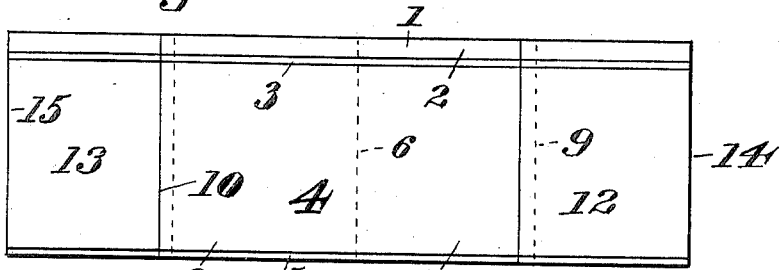
Figure 2:
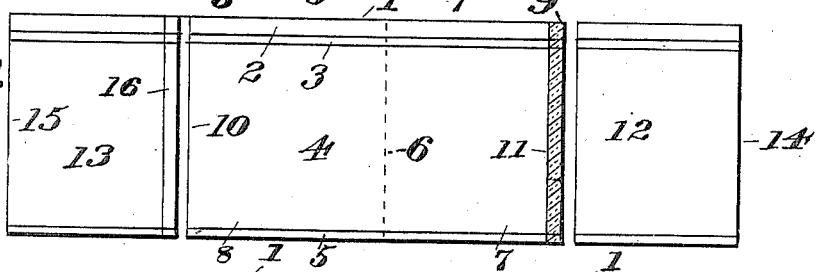
Figures 3, 4:
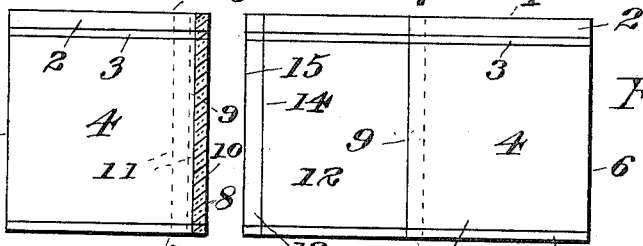
Figure 5:
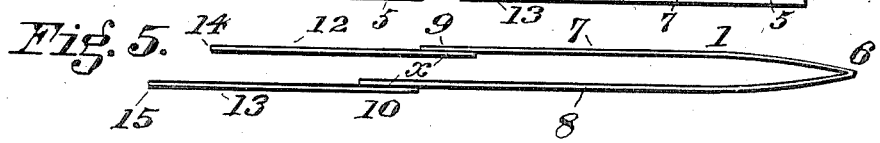

In the accompanying drawings, which serve to illustrate my invention, Figure 1 is a view drawn to a small scale and showing a blank or form constructed according to my invention. Fig. 2 is a similar view showing the blank or form with its several parts detached from each other. Fig. 3 is a view showing the main sheet or body of the blank or form in folded condition. Fig. 4 is a view showing the folded main sheet or body of the blank with the extensions or agents' sheets attached thereto. Fig. 5 is a view drawn to a larger scale and showing in edge elevation the folded blank with its extensions attached to the main sheet or body thereof. Fig. 6 is an enlarged fragmentary view showing the left-hand side of the blank and showing the arrangement of the forms on one surface thereof. Fig. 7 is a view similar to Fig. 6, but illustrating the right-hand side of the blank.

In the views, 1 indicates the body portion or main sheet of the blank-form, having produced upon its opposite sides forms suited to the work for which the record is designed, the two forms on opposite sides of the sheet being usually similar, although this is not essential to my invention. As shown in the drawings, the form produced on each side of the sheet 1 comprises a heading-space 2, extended across the top of the sheet; a head-line 3, beneath the heading 2; and a blank space 4, beneath the head-line 3 and preferably ruled and laid off in columns for tabulated work, and a space 5, also extended across the bottom of the sheet for footing up the columns of the space 4.

6 indicates the line of fold of the main sheet or body 1, this line being located slightly to one side of the center of the said sheet, so as to produce two plies or leaves 7 and 8 of different widths, the edge 9 of the narrower ply or leaf 7 being thereby caused to lie inside of and spaced apart from the edge 10 of the wider ply or leaf 8, which extends or projects, as shown in Fig. 5, when the main sheet or body 1 is folded. The edge portions 9 and 10 of the plies or leaves 7 and 8 are preferably provided with stripes 11 of mucilage or gum produced along them, the stripes being upon opposite sides of the sheet when the same is in the flat.

In connection with the main sheet or body 1 above described I employ two extensions or agents' sheets 12 and 13, which are formed similarly to each other, being provided with printed forms suitable to the use to which the improved blank is to be put and being laid off by ruling and column-rules in a manner similar to the main sheet or body 1. Each extension or agent's sheet has along one edge a blank space 16, adapted to be lapped over and cemented to one edge of the main sheet or body 1 by means of the gummed stripe 11 thereon, so as to be permanently attached thereto. The extensions or agents' sheets 12 and 13 are similar in every way to each other, and in the case of use in a railway office one of these sheets is to be filled in by each agent of the railway company to indicate sales of tickets, together with detailed information concerning each ticket sold. Each extension or agent's sheet has heading-spaces similar to the heading-spaces 2 of the main sheet 1, and on one side of said extension or agent's sheet is printed a form 2ª to be filled out with the information above noted concerning ticket sales. The headline 3 of the agent's sheet, above the blank portion of the form 2ª, has a number of divisions 17 with printed heads corresponding to the columns produced in said form.

The forms on opposite sides of the main sheet are exactly similar, being arranged to produce columns, at the top of each of which, in the head-line 3, is a space 18, to be filled in with the name of a connecting railway, one of said spaces, usually the first, being also filled in with the name of the railway using the improved blank.

The agents' sheets 12 and 13 have, on their sides opposite to the forms 2ª, other forms 19, composed of horizontal ruled lines and column-rules arranged similarly to the forms produced on the space 4 of the main sheet and having at the tops of their columns spaces 18, in which may be filled the names of connecting roads.

When the forms 2ª of the extensions 12 and 13 have been filled in by the several agents, they are forwarded to the general offices of the company and are attached to the edges of the main sheet, each agent's sheet being so attached that its form 2ª will be at the left-hand side of the form on one side of the main sheet 1, and consequently its form 19 on the right-hand side of the form on the opposite side of the main sheet, so that the form 2ª of one agent's sheet will constitute the beginning of the form on one side of the main sheet, the end or continuation of the latter form being produced by the form 19 of the other agent's sheet. After the sheets have been so attached the information given on the agent's sheet 13 is carried over and tabulated on the main sheet 1 and on the back of the succeeding agent's sheet 12, so as to produce a tabulated record of ticket sales, to which are attached the agents' original reports, so as to be easily accessible for reference or verification. It will also be evident that where the agents' sheets are not completely filled by the information given in their forms 2ª their lower portions may be clipped off, and a number of them may be attached to the same edge of the main sheet 1 in such a way as to lessen the thickness of the volume when the sheets are bound together.

The construction of the improved blank or form not only permits a saving of labor in case of verification of the record by reason of the agents' sheets containing their reports being directly attached to it, but also effects an important economy in the cost of the blanks and in binding and insures a very considerable reduction of the size of the volume into which the blanks are bound by the utilization of the back of the agent's sheet as part of the blank itself. Also by folding the blanks so that their leaves are of unequal widths it is evident that the double thicknesses of paper at opposite edges of the blank where the agents' sheets are attached are brought out of line, so as to effect a very material reduction in the thickness of the volume, which would otherwise be twice as thick at this point as at the point of binding. It will also be obvious from the above description of my improvements that the improved blank or form is capable of considerable modification without material departure from the principles and spirit of the invention and may be adapted for other uses than railway records, and for this reason I do not wish to be understood as limiting myself to the precise form and arrangement of the several parts herein set forth nor to the use of the improved blank for railway records exclusively.

Having thus described my invention, I claim—

1. A blank for records comprising a main sheet or body having its opposite surfaces provided with suitable forms, and an extension or agent's sheet adapted for attachment to one edge of the main sheet or body and having produced upon its opposite sides forms one of which corresponds with and forms the beginning of one of the forms upon the main sheet or body and the other of which corresponds with and constitutes a continuation of the other form upon the main sheet or body, substantially as set forth.

2. A blank for records comprising a main sheet or body having its opposite surfaces provided with suitable forms and two extensions or agents' sheets adapted for attachment to opposite edges of the main sheet or body and each having produced upon its opposite sides forms one of which corresponds with and constitutes the beginning of one of the forms of the main sheet or body and the other of which corresponds with and constitutes a continuation of the other form of the main sheet or body, substantially as set forth.

3. A blank for records having a main sheet or body the opposite sides of which are provided with forms, said main sheet or body being folded at one side of its central part to produce leaves or plies of unequal widths the edges of which are out of line and are provided with stripes of gum or the like, substantially as set forth.

4. In a blank for records, the combination of a main sheet or body folded at one side of its central part to produce leaves or plies of unequal widths the edges of which are out of line, and two extensions or agents' sheets secured to the respective edges of the folded main sheet or body with their points of attachment thereto alongside of, but out of line with each other, substantially as set forth.

Signed by me at Cincinnati, Ohio, this 12th day of April, 1900.

CHARLES E. STRUBLE.

Witnesses:
BURTON W. SPENCER,
WILLIAM P. BIDDLE.